United States Patent Office 3,681,298
Patented Aug. 1, 1972

3,681,298
COPOLYMER CONTAINING ISOBORNYL METHACRYLATE
Marvin J. Hurwitz, Elkins Park, and Walter G. De Witt III, Southampton, Pa., assignors to Rohm and Haas Company, Philadelphia, Pa.
No Drawing. Filed Aug. 3, 1970, Ser. No. 60,654
Int. Cl. C08f 15/16, 15/40, 45/22
U.S. Cl. 260—78.5 R          9 Claims

ABSTRACT OF THE DISCLOSURE

Low molecular weight copolymers of (1) acrylic acid esters or methacrylic acid esters of alcohols such as methanol with (2) esters of bicyclic alcohols such as isobornyl alcohol and unsaturated acids such as methacrylic acid, as contrasted with high molecular weight copolymers of such monomers (1) and (2) (see U.S. Pat. No. 3,485,775) and as contrasted to other acrylic polymers, are found to be exceptional in compatibility with practically all types of polyesters and alkyds and with many other types of lacquer film-forming materials. The modifiers particularly for alkyds need not be selected on the basis of the oil length or solvent (aromatic or aliphatic), the modifiers being compatible with long oil alkyds, medium oil alkyds, and short oil alkyds. When small amounts of unsaturated amine-containing monomers or unsaturated carboxylic acids, or other polar monomers and combinations thereof, are incorporated in the polymer solutions, they become improved pigment dispersants. Such pigment dispersions can be let down with many types of synthetic resins and used by air-drying or baking the coated articles. Lacquers for metals, paints, and printing inks are examples of uses for such blends.

---

This invention relates to copolymers of unsaturated esters of bicyclic alcohols and unsaturated acids. In a specific embodiment, polymers are provided which have large proportions of copolymerized isobornyl methacrylate and methyl methacrylate, optionally with minor amounts of polar monomers which are known to improve adhesion of coatings containing the same to various substrates and which improve the ability of the polymer solutions to "wet" pigments and pigment-like dyes.

Acrylic polymers have long been used as modifiers for various other polymers, including alkyds and oil-modified alkyds, cellulose esters, such as nitrocellulose and cellulose acetate butyrate, and other vinyl polymers such as polyvinyl chloride polymers. However, in the past, acrylic polymers were limited as to compatibility in that only certain classes of resins or polymers could be modified with a given acrylic polymer. An example of this is U.S. Pat. No. 2,964,483 (U.S. Class 260—22), which states that "... alkyds having oil lengths longer than 45% tend to blend less well with vinyl copolymers ..." than do short-oil alkyds. While there are acrylics compatible with one or more, but not all, of short oil (<46% oil), medium oil (46–55% oil), long oil (56–70% oil), and very long oil (>71% oil) alkyds and other modified film-forming polymers such as the cellulose esters, a universally compatible acrylic modifier which also has other necessary and desirable properties has long been sought.

It has now been found that 40% to 60% by weight of a compound of the formula

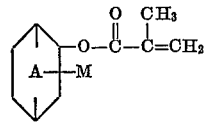

where A is selected from the group consisting of —CH$_2$—, —CH(CH$_3$)—, and —C(CH$_3$)$_2$—, and M is selected from the group consisting of a hydrogen atom and at least one methyl group, and 40% to 60% of styrene, vinyl toluene, or, preferably, at least one ester of acrylic acid or methacrylic acid, and having an average molecular weight of 1,000 to 8,500, preferably 2,000 to 3,000, are compatible with essentially all types of alkyds (styrenated, chain-stopped, methacrylated, etc.) and with all oil length alkyds. Also, contrasted with prior acrylic modifiers, the present invention permits the use of either aliphatic or aromatic hydrocarbon solvents. The polymers of the present invention are also compatible with many other resins including the cellulosics, vinyls, chlorinated rubber, acrylics, etc. With the alkyds, for example, the subject polymers, in addition to the unique compatibility with all film-forming alkyd resin types and oil lengths, provide improved drying time, color and gloss, hardness development, and water spotting resistance, and permit higher spray solids. Suitable ratios of (A) the film-forming resin and (B) the copolymer of the bicyclic alcohol ester of methacrylic acid with styrene, vinyl toluene, or an ester of acrylic or methacrylic acid with an alcohol, are such that the weight ratio of (A) to (B) is between 9:1 and 1:9, preferably from 1:4 to 4:1. Optionally up to 5% by weight of one or more of an α,β-ethylenically unsaturated carboxylic acid or compounds of the Formulas II, III, IV, or V, given below, or combinations thereof, are included as comonomers. Such materials provide the known function of improving adhesion of the acrylic polymers and other polymers modified therewith (U.S. Pat. Nos. 3,037,955 and 3,061,564) and for improving pigment or pigment-like dye dispersibility in the subject acrylic polymers.

The acrylic acid and methacrylic acid ester monomers include methyl acrylate, ethyl acrylate, propyl acrylate, isopropyl acrylate, butyl acrylate, isobutyl acrylate, sec-butyl acrylate, amyl acrylate, isoamyl acrylate, hexyl acrylate, 2-ethylhexyl acrylate, octyl acrylate, 3,5,5-trimethylhexyl acrylate, decyl acrylate, dodecyl acrylate, cetyl acrylate, octadecyl acrylate, octadecenyl acrylate, n-amyl methacrylate, secamyl methacrylate, hexyl methacrylate, 2-ethylbutyl methacrylate, octyl methacrylate, 3,5,5-trimethylhexyl methacrylate, decyl methacrylate, dodecyl methacrylate, octadecyl methacrylate, butoxyethyl acrylate or methacrylate or other alkoxyethyl acrylate or methacrylate, methyl methacrylate, ethyl methacrylate, propyl methacrylate, isopropyl methacrylate, butyl methacrylate, sec-butyl methacrylate, and tert-butyl methacrylate, tert-amyl methacrylate, tert-butyl or tert-amyl acrylate, cyclohexyl acrylate or methacrylate, lauryl acrylate or methacrylate, and phenoxyethyl methacrylate. The alcohol moiety has 1–18 carbons.

Preferred are acrylic and methacrylic acid esters, the homopolymers of which have a Tg of at least 10° C. and preferably at least about 65° C. Among the acrylic acid and methacrylic acid esters, methyl methacrylate is especially preferred.

Besides the essentially non-functional monomers just recited, there may be included within the copolymer up to 5% by weight of various reactive monomers including the α,β-unsaturated carboxylic acids, half esters, and half amides of α,β-unsaturated acids, dicarboxylic acids, and salts thereof with ammonia, an alkali-metal, such as sodium, potassium or lithium, or a volatile water-soluble amine such as dimethylamine or triethylamine.

Examples of copolymerizable ethylenically unsaturated monocarboxylic or polycarboxylic acids are sorbic, cinnamic, vinyl furoic, α-chlorosorbic, p-vinylbenzoic, acrylic, methacrylic, maleic, fumaric, aconitic, atropic, crotonic, and itaconic acid, or mixtures thereof, with itaconic acid and the α,β-unsaturated monocarboxylic acids, particularly methacrylic acid and acrylic acid, being preferred. Other copolymerizable acid monomers include the alkyl half esters or partial esters of unsaturated polycarboxylic acids such as of itaconic acid, maleic acid, and fumaric acid, or the partial amides thereof. Preferred half esters are the lower alkyl ($C_1$ to $C_6$) esters such as methyl acid itaconate, butyl acid itaconate, methyl acid fumarate, butyl acid fumarate, methyl acid maleate, and butyl acid maleate. Such partial esters and partial amides are considered to be "α,β-unsaturated monocarboxylic acids," and the term as used herein includes such esters and amides.

Acrylamide, methacrylamide, and various other monomers falling within the definitions of Formulas II, III, IV, and V, are also useful, as follows:

$$\underset{(R^\circ)_n}{\underset{N}{\boxed{\phantom{XXX}}}}\!\!-\!CH\!=\!CH_2 \quad \text{(II)}$$

where $R^\circ$ is selected from the group consisting of H and alkyl groups having 1 to 4 carbon atoms, and
$n$ is an integer having a value of 1 to 4, $$CH_2=C(R)AYNR^1R^2 \quad \text{(III)}$$

where

R is selected from the group consisting of H and $CH_3$,
A is selected from the group consisting of O, S, $$-\overset{O}{\underset{\|}{C}}O-, \text{ and } -\overset{O}{\underset{\|}{C}}-NH-$$

Y is an alkylene group having 2 to 4 carbon atoms,
$R^1$ is selected from the group consisting of H and an alkyl group having 1 to 4 carbon atoms, and
$R^2$ is selected from the group consisting of H and an alkyl group having 1 to 4 carbon atoms, $$CH_2=C(R)COOCH_2CONHZN\underset{\underset{O}{\overset{\|}{C}}}{\overset{Z}{\diagup\diagdown}}NH \quad \text{(IV)}$$

where

R is the same as above, and
Z is an alkylene group having 2 to 3 carbon atoms.

Examples of compounds of Formula II include:

2-vinylpyridine;
2-vinylpyridine;
4-vinylpyridine;
2-methyl-5-vinylpyridine;
5-methyl-2-vinylpyridine;
4-methyl-2-vinylpyridine;
2-ethyl-5-vinylpyridine;
2,3,4-trimethyl-5-vinylpyridine;
3,4,5,6-tetramethyl-2-vinylpyridine;
3-ethyl-5-vinylpyridine;
2,6-diethyl-4-vinylpyridine.

Examples of compounds of Formula III include: dimethylaminoethyl acrylate and methacrylate; diethylaminoethyl acrylate and methacrylate; dimethylaminopropyl acrylate and methacrylate; diethylaminopropyl acrylate and methacrylate; dipropylaminoethyl acrylate and methacrylate; di-n-butylaminoethyl acrylate and methacrylate; di-sec-butylaminoethyl acrylate and methacrylate; di-t-butylaminoethyl acrylate and methacrylate; dimethylaminoethyl vinyl ether and sulfide; diethylaminoethyl vinyl ether and sulfide; aminoethyl vinyl ether and sulfide; monomethylaminoethyl vinyl ether and sulfide; N,N-dimethylaminoethyl acrylamide and methacrylamide; N,N-diethylaminoethyl acrylamide and methacrylamide.

Examples of compounds of Formula IV include:

N-[β-(α-methacryloxyacetamido)ethyl]-N,N'-ethyleneurea;
N-[β-(α-acryloxyacetamido)ethyl]-N,N'-ethyleneurea;
N-[β-(α-acryloxyacetamido)ethyl]-N,N'-trimethyleneurea;
N-[β-(α-methacryloxyacetamido)ethyl]-N,N'-trimethyleneurea.

$$CH_2=C(R)CONHZN\underset{\underset{O}{\overset{\|}{C}}}{\overset{Z}{\diagup\diagdown}}NH \quad \text{(V)}$$

where R and Z are as defined above, of which an example is N - [β-(methacrylamido)ethyl]-N,N'-ethyleneurea.

The copolymer additives of the invention may be made by a variety of methods. One suitable method is by bulk polymerization of the monomeric ingredients. In accordance with that process a suitable amount of monomers is mixed with an addition polymerization catalyst, such as azobisisobutyronitrile, lauroyl peroxide, acetyl peroxide, t-butyl peracetate, t-butyl hydroperoxide, etc., at a temperature sufficient to cause polymerization such as in the range of 25° to 100° C. or higher. Commonly used molecular weight regulators such as the aliphatic mercaptans, for example, n-dodecyl mercaptan, are also included in the polymerization mixture. High temperature solution polymerization also gives low molecular weight.

The copolymers also may be prepared by granular, emulsion, or solution polymerization of the several comonomers and, if desired, a portion having a preferred narrow range of molecular weight may be extracted from the products of such polymerization procedures by preferential solvent techniques in accordance with well-known practice. A preferred method of preparing the copolymers involves introducing suitable proportions of the comonomers with a solvent which may be a solvent for both the monomers and the copolymers and with a catalyst, such as one of the well-known organic peroxide catalysts, such as benzoyl peroxide, or one of the well-known azo catalysts, such as α,α'-azodiisobutyronitrile, into a reaction vessel in which the mixture is heated with continuous agitation for a period of 2 to 9 hours followed by cooling.

The lacquer may contain one or more external plasticizers in an amount up to 50% by weight of the weight of the copolymer. Examples of plasticizers that are suitable include benzyl butyl phthalate, dibutyl phthalate, triphenyl phosphate, 2-ethyl hexyl benzyl phthalate, and dicyclohexyl phthalate. Other well-known plasticizers which may be employed include diallyl phthalate, dibenzyl phthalate, butyl cyclohexyl phthalate, mixed benzoic acid and fatty acid esters of pentaerythritol, poly(propylene adipate) dibenzoate, diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di 2-ethylhexyl ester of hexamethylene diphthalate, and di(methylcyclohexyl) phthalate. The particular plasticizer and the amount thereof used are chosen in accordance with the demand for compatibility.

Various solvents may be employed, such as toluene, xylenes, acetone, methyl ethyl ketone, methyl isobutyl ketone, methyl isopropyl ketone, amyl alcohol, 2-ethoxyethyl acetate, ethyl acetate, butyl lactate, amyl acetate, methyl acetate, denatured ethyl alcohol, isopropanol, diacetone alcohol cyclohexanol, ethylene dichloride, diisobutyl ketone, cyclohexanone, 2-butoxyethanol, furfuryl, petroleum naphtha, boiling in the range of about 87° to about 145° C., cyclohexane, hexane, aromatic hydrocarbon mixtures, such as "Solvesso 150," and also various aliphatic, naphthenic and aromatic naphthas. While certain of these solvents cannot be used alone because of lack of solvent power for the copolymers but they can in a mixture with others. Obviously, mixtures of such solvents are generally quite useful.

Among the resins which may be modified by the polymers of the invention are the alkyds including the drying oil-modified alkyds, rosin-modified alkyds, mixed or co-reacted alkyds and aminoplasts, mixed or co-reacted alkyds and epoxy resins, mixed or co-reacted alkyd/aminoplast/epoxy resins, mixed or co-reacted epoxidized esters of higher fatty acids with aminoplast resins and so on.

Other examples of alkyds and a relatively complete discussion of alkyds resins is found in the Encyclopedia of Chemical Technology, by Kirk and Othmer, Second Edition, volume 1, pages 851–882, incorporated herein by reference. As this reference points out, as the amount of modifying drying or non-drying natural oil is increased, the amount of dibasic acid in the polyester thereof with the polyol is decreased.

While, for certain purposes, a clear lacquer may be employed, it is quite general to include pigments in an amount up to 100% by weight of the polymer in the lacquer finishing compositions. Examples of suitable pigments include titanium dioxide, carbon black, iron blues, phthalocyanine blues and greens; metal oxides; hydroxides, sulfides, sulfates, silicates and chromates; organic maroons, aluminum flake, bronze powders, pearl essence, and various fillers or extenders such as talc, barytes, china clay and diatomaceous earth.

It will be obvious to those skilled in the organic coating art that the amount of pgiment may be varied widely, depending on the effect desired. The amount of pigment, by weight based on the weight of the organic film-forming material, may vary between about 2% for light, high-hiding pigments, such as carbon black, and about 100% for heavy, low-hiding pigments such as lead chromate.

It is common practice in the coating art to prepare liquid coating compositions on a commercial basis in a highly concentrated form. In comparison with the same composition in a thinned or diluted form ready for application, the concentrated form is more resistant to pigment settling during storage, is cheaper to store and ship because less weight and space are involved, and is in a more adaptable condition for the addition of thinning and/or other modifying materials by the ultimate user to adjust the composition to his own liking. Therefore, the concentrated coating compositions from which the lacquers of this invention may be prepared by merely admixing appropriate organic liquids form a part of this invention. The maximum degree of concentration, i.e., the maximum non-volatile solids content, is limited only by the maximum consistency which can be conveniently handled by the manufacturer and the ultimate user. While concentrated lacquers having a non-volatile solids content of 75% by weight, or even higher, may be prepared; the normal concentration is usually between 30 and 60%. The minimum concentration is obviously the solids content of the ready-to-apply lacquers; but, as previously mentioned, such compositions are not usually prepared by the manufacturer because they are not adaptable to adjustment by the user.

The method of dispersing or grinding pigment in the film-forming materials is not critical provided a smooth, uniform dispersion of finely divided pigment is produced. Examples of suitable equipment well known in the art are ball, pebble, buhrstone, roller, and colloid mills and kneader-mixers, such as Banbury or Warner-Pfleiderer.

The concentrated lacquers may be reduced to whatever concentration is suitable for the particulate manner of application. The application concentration may vary from about 5 to 30% non-volatile solids (that is, including plasticizer), depending upon the manner of application and the thickness of coating desired. For spraying, the concentration may be between 10 and 20% solids.

The copolymers are compatible with various amino-plasts or thermosetting resin-forming precondensates including the condensates of formaldehyde with phenol, urea, thiourea, N,N'-ethyleneurea, aminotriazines such as melamine, benzoguanamine, and acetoguanamine, as well as the alkylated formaldehyde condensates with the various compounds just named in which the alkylation is effected with methanol or in some cases ethanol. A small amount of an amine salt, such as triethylamine maleate, may be added for the purpose of developing an acid on heating which serves to catalyze the insolubilization of the condensate during baking. The compositions containing the thermosetting resin-forming condensates may be applied to any of the various substrates mentioned herein, but they are particularly useful for forming hard finishes of thermosetting character on metal surfaces, particularly on such household appliances as refrigerators, stoves, and the like. The application of such mixed copolymer/thermosetting condensate compositions is followed by drying and a curing or baking at a temperature of 212° to 450° F. The time of curing may vary from a period ranging from one-half to three minutes at the upper temperature or higher, whereas the baking may be effected for about one-half hour at the lower temperature of the range just mentioned.

In addition to the alkyds discussed by Kirk and Othmer and those of the examples, reference may be had to "Synthetic Resins for Coatings," Bulletin No. C–160, February 1966, Rohm and Haas, Resins Department, Philadelphia 19105, which is incorporated herein by reference and which gives further details of lacquer and enamel formulations with alkyds.

EXAMPLE 1

The following materials are mixed to form solution:

| | G. |
|---|---|
| Methyl methacrylate | 500 |
| Iso-bornyl methacrylate | 420 |
| n-Dodecyl mercaptan | 75.00 |
| Acetyl peroxide (25% solution in dimethyl phthalate) | 1.50 |
| Lupersol No. 7 peroxy catalyst | 2.50 |
| t-Butyl hydropeoxide 70% | 0.75 |
| Aerosol OT wetting agent | 0.16 |
| Oxalic acid (2.8% in water) | 0.25 |

The mix is degassed at 25 inches of vacuum and poured into a suitable container. The mass is heated in a forced air oven at 65° C. for eighteen hours and then heated at 80° for 2 hours and finally, heated for 6 hours at 120° C. to provide a colorless, transparent mass which is readily granulated or powdered.

EXAMPLES 2 AND 3

| | | |
|---|---|---|
| Methyl methacrylate | 450.0 | 450.0 |
| iso-Bornyl methacrylate | 450.0 | 450.0 |
| t-Butylaminoethyl methacrylate | 12.0 | 12.0 |
| Methacrylic acid | 8.0 | 8.0 |
| n-Dodecyl mercaptan | 75.0 | 75.0 |
| t-Butyl peroctoate | 1.0 | 1.0 |
| Azo-isobutyronitrile | 0.5 | 0.25 |
| Lupersol 7 (t-butyl peroxy acetate) | 2.5 | 2.5 |
| Dicumyl peroxide | 1.5 | 1.5 |
| Oxalic acid (2.8% in water) | 0.25 | 0.25 |
| Terpinolene | 0.05 | 0.0 |

EXAMPLE 4

The powered resins of Examples 1, 2 and 3 are dissolved in xylol or mineral thinner along with various alkyds to give a total solids content of 50%. The acrylic/alkyd ratio on a weight basis is 50/50 and 75/25. The alkyds used include a short (37%) cottonseed oil, short (42%) soya oil, medium (55%) castor oil, short-medium soya oil, long (65%) soya oil, medium styrenated linseed oil, and short methacrylated styrenated castor oil alkyds having 22–47% phthalic anhydride and made with polyols including glycerol, ethylene glycol, trimethylolpropane, pentaerythritol, and trimethylolethane. The acrylics and alkyds are found to be compatible in solution, and when cast on glass in a film 25 mils thick which films are then air dried in one set of tests and baked at 250° F. for 30 minutes in another set of tests. The solutions were clear and the films were clear, and not cloudy as is the case with incompatible systems.

EXAMPLE 5

Fifty pounds of Toluidine red, 100 pounds of the product of Example 2, and 120 pounds of mineral thinner are ground on a roller mill until the pigment is well dispersed.

This pigment dispersion is then mixed with 400 pounds of a short oil ((linseed oil) phthalic anhydride-ethylene glycol alkyd in an equal weight of xylol with 3 pounds of 6% cobalt naphthenate and 4 pounds of 6% calcium naphthenate. This enamel can be applied by brush or by spraying when appropriately diluted with solvent. The same example repeated with octane as solvent or with a very long oil alkyd gives comparable results.

We claim:

1. An organic solvent solution of a copolymer of about 40% to 60% by weight of a compound of the formula

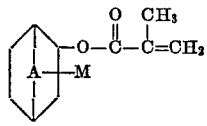

where A is selected from the group consisting of —$CH_2$—, —$CH(CH_3)$—, and —$C(CH_3)_2$—, and M is selected from the group consisting of a hydrogen atom and at least one methyl group, and 40% to 60% by weight of styrene, vinyl toluene, or at least one ester of acrylic acid or methacrylic acid and at least one aromatic, monocyclic aliphatic, or open chain aliphatic alcohol or alkoxy alcohol having from 1 to about 18 carbon atoms, said copolymer having an average molecular weight of from 1,000 to 8,500.

2. The composition of claim 1 in which the Tg of a homopolymer of said ester is at least 10° C.

3. The copolymer of claim 1 containing a total of a finite amount up to about 5% by weight of one or more of a copolymerizable ethylenically unsaturated acid or salt thereof, acrylamide, methacrylamide, or a monomer falling within one or more of the formulas

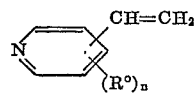

where

R° is selected from the group consisting of H and alkyl groups having 1 to 4 carbon atoms, and
$n$ is an integer having a value of 1 to 4;

$$CH_2=C(R)AYNR^1R^2$$

where

R is selected from the group consisting of H and $CH_3$,
A is selected from the group consisting of O, S,

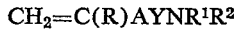

Y is an alkylene group having 2 to 4 carbon atoms,
$R^1$ is selected from the group consisting of H and an alkyl group having 1 to 4 carbon atoms, and
$R^2$ is selected from the group consisting of H and an alkyl group having 1 to 4 carbon atoms;

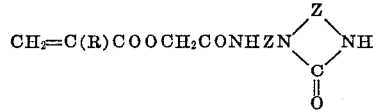

where

R is the same as above, and
Z is an alkylene group having 2 to 3 carbon atoms, and

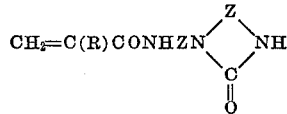

where R and Z are as defined above.

4. The composition of claim 2 in which said ester is an ester of methacrylic acid.

5. The composition of claim 1 in which said copolymer consists essentially of 45% to 55% of at least one of styrene, methyl acrylate, or an ester of methacrylic acid with an alkanol having from 1 to 4 carbon atoms and isobornyl methacrylate in an amount of about 45% to 55%, and in which the average molecular weight of the polymer is between about 2,000 and 3,000.

6. The composition of claim 5 in which the copolymer consists of isobornyl methacrylate and methyl methacrylate, and optionally, up to a total of 5% of one or more of an alkylaminoalkyl acrylate or methacrylate and acrylic acid, methacrylic acid, or itaconic acid.

7. A copolymer consisting essentially of 45% to 55%, by weight, of isobornyl methacrylate and 45% to 55% by weight of methyl methacrylate, and an adhesion promoting amount up to a total of about 5% of one or more of $t$-butylaminoethyl methacrylate and methacrylic acid said copolymer having an average molecular weight of from 1,000 to 8,500.

8. A coating containing the copolymer of claim 1.

9. A coating containing the polymer of claim 6.

References Cited

UNITED STATES PATENTS

| | | | |
|---|---|---|---|
| 2,964,483 | 12/1960 | Johnson et al. | 260—22 |
| 3,037,955 | 6/1962 | Carman | 260—30.0 |
| 3,061,564 | 10/1962 | Zdanowsoh et al. | 260—27 |
| 3,485,775 | 12/1969 | Cenci et al. | 260—899 |

JOSEPH L. SCHOFER, Primary Examiner

S. M. LEVIN, Assistant Examiner

U.S. Cl. X.R.

260—30.6 R, 30.8 R, 31.2 R, 31.6, 31.8 R, 32.4, 32.8 R, 33.4 R, 33.6 UA, 33.8 UA, 41 R, A, F, C, 62, 79.7, 80.72, 80.73, 80.76, 80.8 80.81, 86.1 E, N, 86.7, 836, 839, 840, 844, 851, 862; 117—126 R, 132 B